United States Patent Office 3,582,374
Patented June 1, 1971

---

3,582,374
REFRACTORY MORTAR
Kermit Mark Bonar, Pittsburgh, and Frank H. Walther and Daniel E. Reardon, Bethel Park, Pa., assignors to Dresser Industries, Inc., Dallas, Tex.
No Drawing. Filed June 3, 1968, Ser. No. 733,819
Int. Cl. C04b *35/10, 35/12*
U.S. Cl. 106—66                 4 Claims

ABSTRACT OF THE DISCLOSURE

A refractory mortar comprising finely divided alumina, chromic oxide and titania, and plasticizing agents and binders.

BACKGROUND

In a continuing effort to improve the quality of steel products, the steel industry has turned to vacuum degassing techniques. Vacuum degassing is performed by drawing molten metal into a refractory-lined vacuum chamber. There are currently several types of vacuum degassers, one of which is known as the DH Degasser in which the molten metal is repeatedly drawn up through a single snorkel from a ladle positioned below the degasser vessel and, thereafter, allowed to fall back. Another type of vacuum degasser, known as the RH Degasser, has two snorkels, one which is used to draw the molten metal up to the vacuum chamber, and another which allows the molten metal to return to its source. This invention pertains primarily to the refractory lining for the vacuum chamber portion of a vacuum degasser or similar metallurgical vessel.

The conditions within vacuum degassers have been found to be extremely damaging to refractory brick linings. In addition to the high temperatures (around 2900° F.) and chemical attack by basic and neutral slags, there are several other very damaging mechanisms. The continual washing action of the molten slag and metal is one most severe. Damage due to thermal shock is prevalent because the vessel is heated very rapidly when molten metal is first drawn into it. Also, the temperature of the vessel fluctuates rapidly in the DH Degasser between cycles.

Brick made from fused magnesite-chrome ore grain which have been ceramically bonded have been found the most satisfactory in vacuum degasser vessels. Their use has been severely limited, however, because satisfactory mortars have not been available. Typically, mortar joints become so severely eroded that the lining must be replaced long before the brick are substantially worn. The most successful mortar in this application, until this invention, was manufactured according to United States Pat. No. 3,208,862, entitled "Mortar" by Ben Davies and D. O. McCreight, assigned to the same assignee as this case.

It is an object of this invention to provide a refractory mortar which is more resistant to siliceous and ferruginous slags.

BRIEF DESCRIPTION OF THE INVENTION

Briefly, according to this invention, a mortar for use in brick-lined metallurgical vessels which contact basic and neutral slags is prepared from a finely divided batch comprising 25 to 60%, by weight, chromic oxide, ½ to 10% titania, and the remainder alumina. In addition to the batch ingredients, plasticizers and binders are present in the mortar. Suitable binders and plasticizers are well known in the art and include organic gums and starches, lignin extracts, chromic acid and sodium chromate. The mortar, on a calcined basis, should analyze less than 3% alkali and alkaline earth oxides, up to 5% $SiO_2$ and up to 5% $Fe_2O_3$. Sodium silicate binders cannot be used if the advantages of this invention are to be obtained.

Alumina suitable for use in this invention includes finely divided calcined and fused bayer process aluminas. The chromic oxide should preferably be pigment grade which is all minus 325 mesh.

Mortars according to this invention are preferably sized to all pass 28 mesh and to have a major portion, by weight, passing 65 mesh.

DETAILED DESCRIPTION

Further features and other objects and advantages of this invention will become clear to those skilled in the art by a careful study of the following detailed description. In the detailed description, all percentages and ratios and parts are by weight; chemical analyses were obtained by spectrographic analysis with control by wet chemical analysis, and are reported as oxides in accordance with the present practice of the refractories industry.

In order to differentiate the relative slag resistance of basic mortars to siliceous and ferruginous slags, such as those found in vacuum degasser vessels, a special test was developed. According to this test, a groove is cut in a ceramically bonded fused magnesite-chrome ore grain brick which is 1½" deep, ⅛" wide and extends across a 4½" side of the brick. Mortars to be tested are mixed with water to provide typical trowelling consistency, and thereafter tamped into the groove in order to attain uniform density. Thereafter, the mortars are dried at about 250° F. for about 5 hours. Mortar joints thus prepared are subjected to a dynamic slag test in which slags having a chemical composition (see Table I) similar to that found in vacuum degassers are dripped onto the joint at temperatures of about 2900° F. Because of the surface of the brick containing the joint is slightly canted, the slag runs along the surface of the joint and off the brick providing a washing action similar to that found in actual service conditions. The surface of the brick exposed to the slag is canted 30° from horizontal. 500 grams of slag are dripped across the surface. The dripping is usually accomplished in 3 to 4 hours. In this test, slag recovered from actual degassers was used. However, synthetic slag may be prepared. The slag is ground to minus 28 mesh or finer and formed into rods with a ½" diameter which are fed into the testing furnace through a water-cooled orifice.

TABLE I

Chemical analysis of synthetic vacuum degasser slag

| | Percent |
|---|---|
| Silica ($SiO_2$) | 28.3 |
| Alumina ($Al_2O_3$) | 5.6 |
| Titania ($TiO_2$) | 0.6 |
| Iron oxide ($Fe_2O_3$) | 26.0 |
| Lime (CaO) | 30.6 |
| Magnesia (MgO) | 6.3 |
| Manganese dioxide ($MnO_2$) | 3.8 |

The results of the drip slag test are evaluated by measuring the deepest erosion as measured in inches, and the length of the eroded groove as measured in inches. The length and depth of erosion are thereafter multiplied together and multiplied by 50 to provide a relative factor. (The factors are rounded to whole numbers.)

Examples I and II were prepared according to this invention from the batches shown in Table II. They were subjected to the special slag erosion test and the results are also given in Table II. Included in Table II are the results of testing two prior art mortars.

TABLE II

| Example | I | II | III | IV |
|---|---|---|---|---|
| Batch (percent): | | | | |
|   Bayer process alumina | 68.5 | 58.5 | | |
|   Chromic oxide | 30 | 40 | | |
|   Titania | 1.0 | 1.0 | | |
| Binders and plasticizers: Amber powder (percent) | 0.5 | | | |
| Erosion factor in slag erosion test | 30 | 40 | 65 | 95 |

Table II establishes that mortars made according to the teachings of this invention have superior resistance to the erosion of slags. Example I is the best mode now known to us for practicing our invention. Example III is the most slag (basic) resistant prior art mortar known. It is made according to the teachings of United States Pat. No. 3,208,862, referred to above. Example IV is typical of the more commonplace prior art mortars. It is essentially fine Philippine chrome ore with a sodium silicate binder.

We have found that the presence of at least 25% $Cr_2O_3$ in the batch is critical. Also, the presence of at least ½% $TiO_2$ is critical.

Binders and plasticizing agents, which are suitable for refractory mortars, are well known and include polysaccharide gums, starches and lignin extracts. These materials are usually added to the batch in amounts between about 0.5 and 1%.

Having thus described the invention in detail, and with sufficient particularity as to enable those skilled in the art to practice it, what we desire to have protected by letters patent is set forth in the following claims:

We claim:

1. A mortar for use in brick-lined metallurgical vessels which contact slags comprising a batch comprising 25 to 60%, by weight, chromic oxide ½ to 10%, by weight, titania, and the remainder alumina, and there being in addition to said batch binders and plasticizers and tempering water, said mortar on a calcined basis analyzing less than 3% alkali and alkaline earth oxides, up to 5% $SiO_2$, and up to 5% $Fe_2O_3$.

2. A mortar according to claim 1 in which the binders and plasticizers are organic.

3. A mortar according to claim 1 in which the $Cr_2O_3$ is pigment grade.

4. A mortar according to claim 1 in which the batch all passes 28 mesh and a major portion, by weight, passing 65 mesh.

References Cited

UNITED STATES PATENTS 3,080,135    3/1963    Steijn    106—66
3,378,385    4/1968    McCreight et al.    106—66

JAMES E. POER, Primary Examiner